(12) United States Patent  
Taylor

(10) Patent No.: US 7,267,529 B2  
(45) Date of Patent: Sep. 11, 2007

(54) DEAERATION SYSTEM

(76) Inventor: John A. Taylor, 12 Park Ave., Pompton Plains, NJ (US) 07444

( * ) Notice: Subject to any disclaimer, the term of this patent is extended or adjusted under 35 U.S.C. 154(b) by 319 days.

(21) Appl. No.: 11/007,368

(22) Filed: Dec. 8, 2004

(65) Prior Publication Data

US 2006/0120858 A1 Jun. 8, 2006

(51) Int. Cl.
*F04D 31/00* (2006.01)

(52) U.S. Cl. ...................... 416/169.1; 96/196

(58) Field of Classification Search ............. 415/169.4, 415/169.2, 169.3, 169.1; 95/261; 96/196, 96/208, 216, 217
See application file for complete search history.

(56) References Cited

U.S. PATENT DOCUMENTS

| | | |
|---|---|---|
| 1,609,413 A | 12/1926 | Kristoffersson |
| 1,993,944 A | 3/1935 | Peebles |
| 2,046,904 A | 7/1936 | Morgan |
| 2,611,241 A | 9/1952 | Schulz |
| 3,546,854 A | 12/1970 | Muller |
| 3,597,904 A * | 8/1971 | Jakobsson et al. .......... 415/143 |
| 3,780,862 A | 12/1973 | Mesing |
| 4,113,452 A | 9/1978 | Brown et al. |
| 4,136,018 A | 1/1979 | Clark et al. |
| 4,382,804 A | 5/1983 | Mellor |
| 4,416,672 A | 11/1983 | Underwood |
| 4,427,421 A | 1/1984 | Jensen et al. |
| 4,435,193 A | 3/1984 | Gullichsen et al. |
| 4,483,697 A | 11/1984 | Deysson et al. |
| 4,955,992 A | 9/1990 | Goodale et al. |
| 4,971,519 A | 11/1990 | Timperi et al. |
| 4,976,586 A | 12/1990 | Richter et al. |
| 5,051,072 A | 9/1991 | Yano et al. |
| 5,064,452 A | 11/1991 | Yano et al. |
| 5,167,678 A | 12/1992 | Elonen et al. |
| 5,182,031 A | 1/1993 | Lamort |
| 5,190,515 A | 3/1993 | Eaton et al. |
| 5,324,166 A | 6/1994 | Elonen et al. |
| 5,622,621 A | 4/1997 | Kramer |
| 5,800,579 A | 9/1998 | Billingsley et al. |

* cited by examiner

*Primary Examiner*—Richard A. Edgar
(74) *Attorney, Agent, or Firm*—Notaro & Michalos PC

(57) ABSTRACT

A deaerator includes a stationary separation chamber with first and second opposite walls or ends and a peripheral wall in between. Rotating vanes are mounted on a shaft. A large inlet leads to the stationary chamber at the first end and is arranged along a center axis of the chamber. An air reject port lies inside the inlet and is arranged along a center axis of the chamber. The vanes are spaced from the peripheral wall to define a gap. An exit chamber is included at the second end between the vanes and second wall. A vacuum is connected through the air reject port. A variable orifice valve is located at the inlet and outlet. Pressure sensors are also provided at the inlet and outlet. The valves are controlled to regulate the fluid flow, internal level, and pressure in the chamber.

25 Claims, 9 Drawing Sheets

DEAERATION SYSTEM

FIELD AND BACKGROUND OF THE INVENTION

The present invention relates generally to the field of liquid and air separation and in particular to a deaerator apparatus and deaeration system for removing air bubbles from a variety of fluids such as coatings.

There are several basic processes for removing air bubbles by centrifugal force. Each process has its drawbacks and none of these is used to make totally air free coating today.

The hydrocyclone spins fluid inside a tube based on the inlet velocity. Hydrocylcones are limited in the viscosity they can treat and cannot remove all air as the fluid exits the separation chamber under pressure allowing bubbles to effervesce at normal atmospheric pressure.

A rotating tank has similar problems. In addition, it is also expensive and limited in the RPM that can safely be achieved.

Another process is a stationary tank with vanes spinning inside. However, thermal or heat buildup is a problem in these systems.

One process does exist that is capable of producing a totally air free coating. This process uses rotating disks inside a vacuum chamber to make a very thin layer. The layer is thin enough so the bubbles rise to the surface and break. Unfortunately, these machines are very expensive because the vacuum chamber has a heavy walled construction to resist implosion. These machines are also difficult to control and keep clean.

Specific apparatuses or systems for removing air bubbles are discussed in more detail below.

U.S. Pat. No. 4,435,193 to Gullichsen et al. discloses a centrifugal pump comprising a housing, an inlet channel at one end of the housing, a fluid outlet at the periphery of the housing, a rotor having axially extending blades, a gas exit chamber separated below the separation chamber by a partition wall, a gas discharge in the gas exit chamber, and openings in the partition wall for communication between the chambers. A suspension is rotated within the pump so that a gas bubble is created at a central part of the pump, and gas is discharged from the gas bubble at a gas discharge pressure. The gas discharge leads to a vacuum pump.

The discharge flow rate of the fluid is controlled by a valve and flow meter in the fluid outlet. A dP instrument is connected between the fluid outlet and a liquid container from which the fluid is introduced into the inlet. A dP controller is connected to the fluid inlet and gas discharge to measure the differential pressure between the suspension inlet and the gas discharge.

U.S. Pat. No. 3,546,854 to Muller discloses a non-rotative centrifugal separator comprising a cylindrical casing, an inlet pipe at one end of the casing, an outlet pipe and a drain pipe at the opposite end, and a baffle assembly comprising vanes mounted on a mounting rim in the shape of a disc. Centrifugal force separates a gaseous fluid into a gaseous stream in the center and an annular envelope of the liquid particles. The gaseous stream exits the outlet while the fluid exits through the drain.

U.S. Pat. No. 3,597,904 to Jakobsson et al. discloses a liquid gas separation apparatus comprising a pump housing, an inlet leading to the housing, a gas discharge pipe contained within the inlet along a central axis of the pump housing, a vacuum source connected to the gas discharge pipe, a pump rotor driven by a shaft for rotating shovels so that the fluid along the walls passes through an outlet at the periphery of the housing.

U.S. Pat. No. 4,136,018 to Clark et al. discloses a vortex separator comprising a cylindrical chamber, an inlet at a first end, coaxial with and surrounding a lightweight rejects pipe, a shaft imparting rotational motion to an impeller at a second opposite end, a perforate wall at the second end, an accepts chamber leading to an accepts pipe, and a heavy rejects outlet in a side wall adjacent the first wall. The impeller defines an annular passage.

U.S. Pat. No. 4,382,804 to Mellor discloses a fluid particle separator comprising a cylindrical housing containing a separator comprising a disk of substantially the same diameter as the internal wall of the housing, leaving a small radial clearance. The disc is formed with a plurality of vanes. A baffle plate is provided behind the separator. A fluid inlet is provided at one end of the housing and a fluid outlet is provided at the opposite end.

U.S. Pat. No. 4,416,672 to Underwood discloses an apparatus for removing gas from mud comprising a chamber having an inlet at one end and mud and gas outlets at the opposite end. A shaft is located centrally along the axis of the chamber and is attached to vanes and two discs spaced apart. As the shaft discs and vanes rotate, a centrifugal force is imparted to the mud separating the gas from the mud. The mud exists through a circumference or peripheral outlet while the gas exits through a plurality of gas outlets.

U.S. Pat. No. 4,955,992 to Goodale et al, discloses a liquid degassing system comprising a liquid reservoir having an inlet for receiving a liquid, an outlet for expelling degassed liquid and a vacuum source controllably connected through a valve to draw gas out of the liquid. A baffle prevents air bubbles from passing to the outlet while allowing the fluid to pass through to the outlet. A valve in the liquid inlet may interrupt flow to the reservoir while a vacuum is applied. A second valve in an outlet conduit may interrupt flow from the reservoir when a vacuum is applied.

U.S. Pat. No. 5,324,166 to Elonen et al. discloses a centrifugal pump comprising a housing with a liquid flow inlet, an impeller with pumping vanes and a central gas passage, and a gas outlet connected to an external vacuum pump. Gas is separated by the impeller and pumping vanes and is collected in the center of the housing where it is withdrawn through the central gas passage of the impeller to the gas outlet.

U.S. Pat. No. 4,976,586 to Richter et al. discloses a pump system comprising a housing with an inlet and an outlet, an impeller having a hub and blades, a hollow tubular body with vanes mounted on a shaft which rotates and forces pulp to the impeller. Gas collected at the impeller is withdrawn through a passage in the shaft of the tubular body via an exterior vacuum pump.

U.S. Pat. No. 5,622,621 to Kramer discloses a fluid separator comprising a cylindrical rotating bowl, an inlet at one end of the drum, circumferentially spaced vanes near the inlet and outlet parts circumferentially spaced about the inlet leading to a gas manifold. Water accumulates at the periphery of the bowl while lighter density gas is forced into the outlet parts. The water moves onto a disk pump compartment via axial passages formed in the periphery of the walls of the bowl.

A centrifugal air compressor having a hub with radially arranged blades is known from U.S. Pat. No. 2,611,241 to Schulz.

Pressure monitoring control of valves is known from U.S. Pat. No. 5,190,515 to Eaton et al. which discloses a system for sensing and controlling the liquid level in a centrifuge bowl comprising a pressure sensor at the outlet of the bowl connected to a controller and valve of the inlet. Gas is withdrawn from the housing via a vacuum source.

U.S. Pat. No. 1,993,944 to Peebles teaches a centrifugal pump in which the pressure inside the pump is monitored to control a valve at the outlet.

U.S. Pat. No. 5,800,579 to Billingsley et al., discloses a pressure control apparatus for a cyclone separator comprising a differential pressure transducer for measuring the pressure within the chamber of the cyclone separator. A pressure sensor is located in the separation chamber and a microprocessor controller ascertains pressure differences between a preset valve and a pressure in the separation chamber. A variable flow control valve is associated with a discharge opening of the chamber and increases air flow in response to increased pressure in the separation chamber sensed by the controller.

There is a need for deaerators that can produce a totally air free coating while having a low heat buildup. Additionally, there is a need in the art for such apparatuses to have a structure which can easily be disassembled for cleaning. Finally, in light of current technologies which use expensive vacuum systems to achieve totally air free coatings, there is a need for an inexpensive solution for producing totally air free coatings. In particular, a deaeration system is needed in which the high cost of a large vacuum chamber and the resulting high cost of creating a vacuum are overcome. There is also a need for differential pressure monitoring for affecting incoming and outgoing fluids and process controls that assure the delivery of air free fluids regardless of process disruptions such as excessive incoming air or temporary loss of vacuum.

SUMMARY OF THE INVENTION

It is an object of the present invention to provide a deaerator that can produce a totally air free coating while having a low heat buildup.

It is a further object of the present invention to provide a deaerator which can easily be disassembled for cleaning.

It is yet another object of the present invention to provide a deaeration system to achieve totally air free coatings while overcoming the high cost of a large vacuum chamber and the resulting high cost of creating a vacuum.

It is another object of the present invention to provide a deaeration system in which differential pressure monitoring can be used to control incoming and outgoing fluids.

It is a further object of the present invention to provide process controls that assure the delivery of air free fluids regardless of process disruptions such as excessive incoming air or temporary loss of vacuum.

Accordingly, a deaerator of the present invention comprises a stationary separation chamber with first and second opposite walls and a peripheral wall in between the first and second opposite walls. A rotating vane is mounted on a shaft. To prevent mixing with a toroidal flow, a disc, secondary angled vanes, or a cylindrical member may be mounted to the rotating vane at appropriate locations. The assembly of the rotating vane with a disc is mounted via a hub and a nut which holds the hub to the shaft. A central portion of the vane is cut out or has a notch so that access is provided for removing the nut from the hub for facilitating disassembly.

A large inlet leads to the stationary chamber at the first wall and is arranged along a center axis of the chamber. An air reject port lies inside the inlet and is arranged along a center axis of the chamber. A gap is defined between the area swept by the rotating vane and the peripheral wall. The gap leads to an exit chamber arranged between the second wall and the rotating vanes. The second wall has an outlet in communication with the gap. If the rotating vane is mounted to a disc, an annulus is provided between the disc and the peripheral wall. The annulus may have the same or different diameter as the gap defined by the vane along the remainder of the chamber. A vacuum is connected through the air reject port. A variable orifice valve is located at the inlet and fluid outlet. Pressure sensors are also provided at the inlet and outlet. The valves are controlled to regulate the fluid flow, internal level, and pressure in the chamber.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
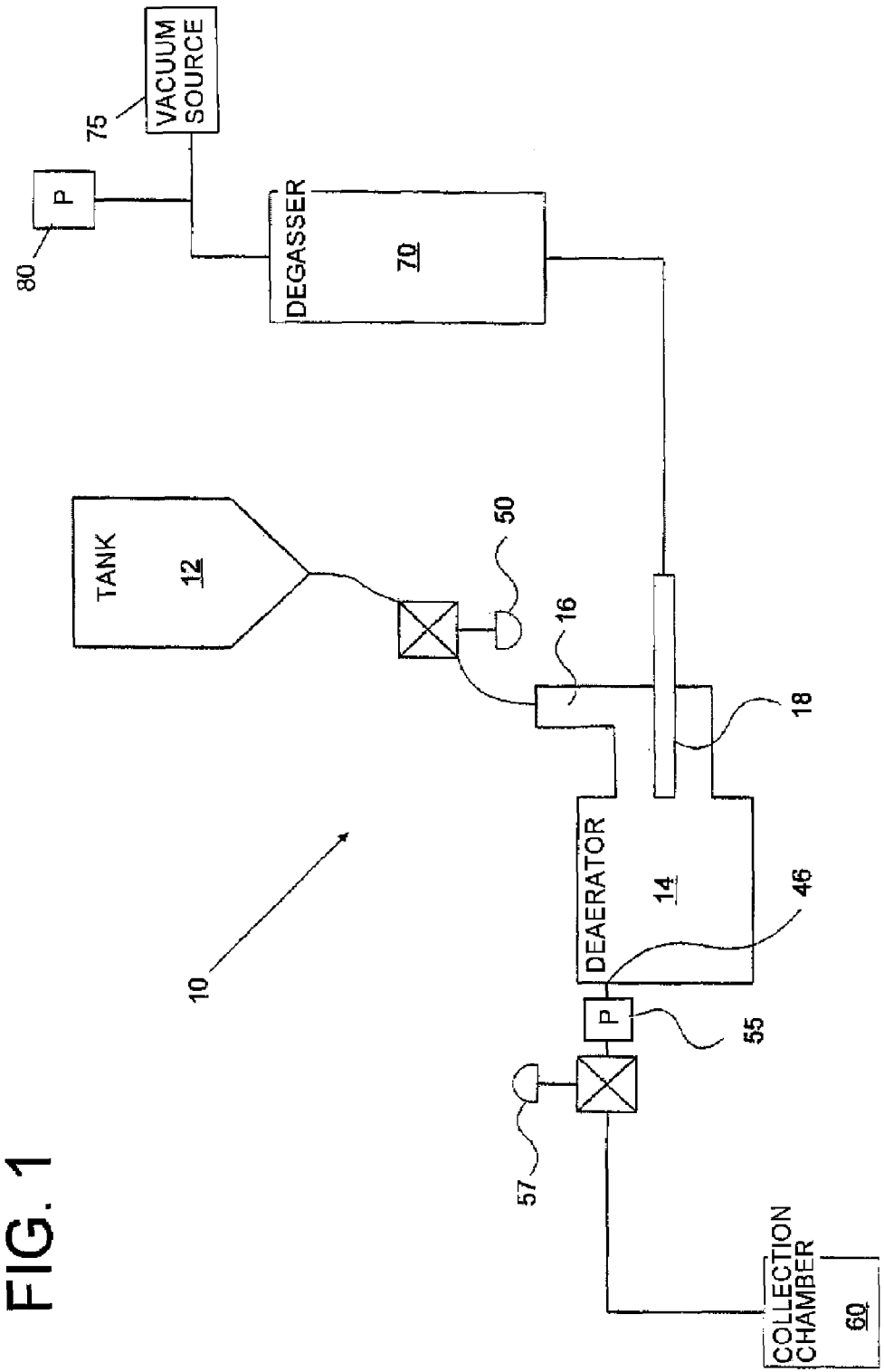
FIG. 1 is a schematic diagram of the deaeration system of the present invention.

Referring now to the drawings, in which like reference numerals are used to refer to the same or similar elements, FIG. 1 shows a deaeration system 10. The deaeration system 10 begins with a tank 12 containing a fluid to be deaerated. A deaerator 14 lies downstream from the tank 12. The deaerator 14 has an inlet 16 and an air reject port 18 at one end and an outlet 46 at an opposite end. Deaerator 14 receives the fluid through inlet 16 and releases deaerated fluid through outlet 46 at the opposite end. A valve 50 is located between the tank 12 and the deaerator 14 for controlling the volume of fluid flowing to the deaerator 14. A pressure sensor 55 and outlet valve 57 are located near the outlet 46 of the deaerator 14. A collection chamber 60 lies downstream from the deaerator 14 and receives deaerated fluid. The air reject port 18 is connected to a degasser 70 and a vacuum source 75. A vacuum sensor 80 is connected to the vacuum source 75. The vacuum source 75 can be any source for creating a vacuum that can be run at minus 12 PSI.

The vacuum is contained in the inlet 16 with a variable orifice valve 50. This valve opening plus the vacuum level controls the flow into the system. A variable orifice valve 57 near the outlet 46 controls the flow out of the system. The valves are directed by the pressure sensors 55 and 80 in the system via suitable control means such as electronic, pneumatic or mechanical means.

For example, the pressure sensor and vacuum sensor can produce an electronic signal which controls the position of the variable orifice valve. Electronic data is sent to a programmable logic controller (PLC) in the form of digital data and voltage data. A Proportional-Integral-Derivative (PID) controller is then used to control the valve. A PID controller measures an "output" of a process and controls an "input", with a goal of maintaining the output at a target value, which is called the "setpoint". The basic idea is that the controller reads a sensor. Then it subtracts the measurement from a desired "setpoint" to determine an "error". The error is then treated in three different ways simultaneously. To handle the present, the error is multiplied by a proportional constant P. P is always negative, to drive the output toward the setpoint. To handle the past, the error is integrated (or averaged, or summed) over a period of time, and then multiplied by a constant I. To handle the future, the first derivative of the error (its rate of change) is calculated with respect to time, and multiplied by another constant D. If the sum of the above is nonzero, but too small to make a difference, produce the smallest value with the same sign (usually −1 or 1). The sum of the above is added to the last output of the PID loop. This eliminates any constant offset in the control behavior. A computer sends a generated output number to the valve. The output number is associated with a function such as open or close. Therefore the valve opens or closes based on the output number provided.

In operation, the control means works with the vacuum level as follows. Due to the nature of vacuum generators, the actual vacuum level floats to balance the airflow extracted from the fluid. Higher airflow will have a lower vacuum, which naturally increases the pumping action of the vacuum generator. If the vacuum gets too low, the liquid flow rate must be slowed down to reduce gas flow and keep the vacuum above the value required for good bubble removal. If the input flow slows down so must the output flow to maintain the level inside deaerator 14. The vacuum capacity is sized large enough so it can exhaust the air coming in at the desired flow rate and air content. It is important for the control means to maintain a minimum vacuum level even if the entering air content varies with an unexpected shock load such as a new batch of coating with high air content. To do otherwise would pass bubbles onto the next process.

Further, the level inside the deaerator 14 must be maintained so as to not flood the vacuum receiver with fluid or starve the chamber with too little fluid to run the process.

Finally the process flow rate and the minimum vacuum level must be adjustable by the operator to suit the requirements of the process and grade being manufactured.

Using the control means described above, the operator sets a maximum flow target and a minimum vacuum level. If the vacuum is below this level, the inlet flow is reduced to reduce the gas load. Once the minimum vacuum level is achieved the inlet valve is held in a position to create the maximum flow rate. This flow rate corresponds to a vacuum level and valve position.

Level regulation inside the deaerator 14 is controlled by sensing the difference between the outlet 46 and inlet pressures. If the level inside the deaerator 14 is allowed to fall, the differential pressure will drop as the centrifugal force has lost the contribution from the core. As the differential pressure falls, a control valve on the outlet 46 closes to restore the level.

Figure 2:
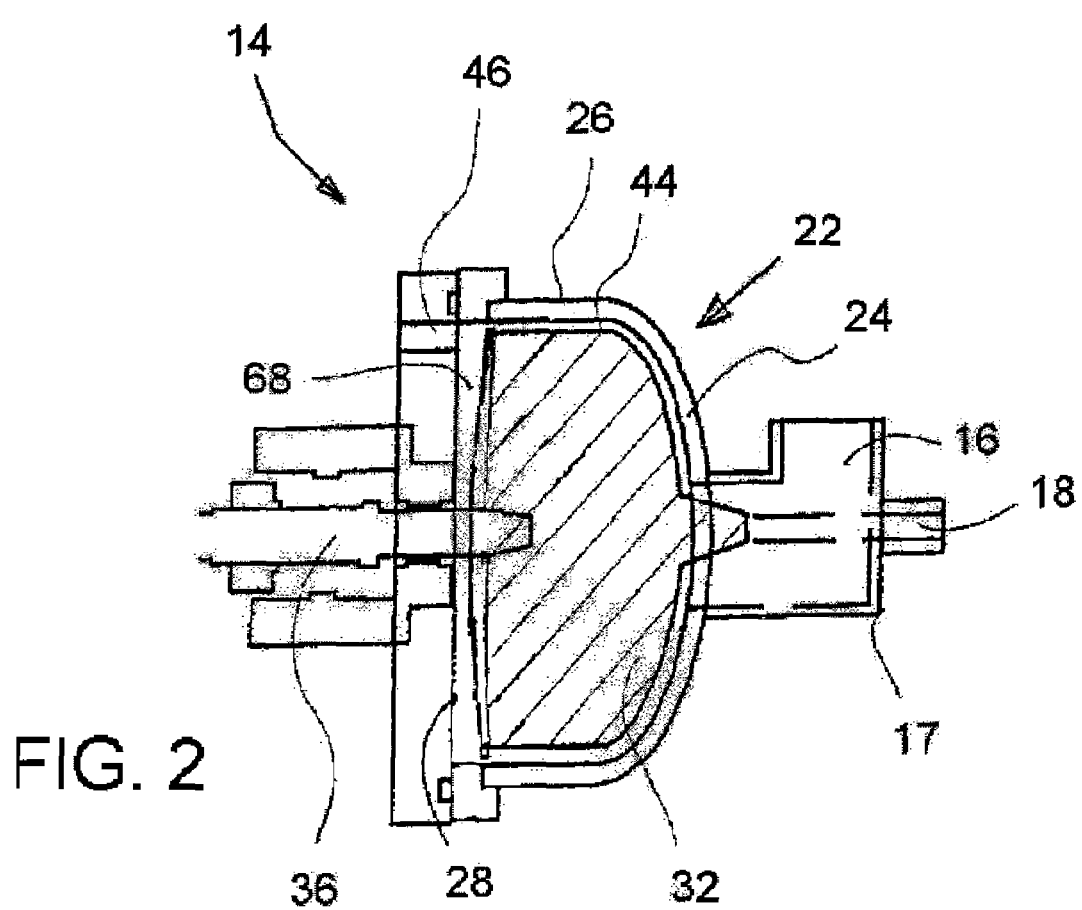
FIG. 2 is a side cross-section view of the deaerator of the present invention

Turning now to the deaerator of the present invention, FIG. 2 shows a deaerator 14 comprising a stationary separation chamber 22 defining a volume and having a center axis. Separation chamber 22 comprises a chamber wall having a front wall portion 24, a peripheral wall portion 26, and rear wall portion 28.

Inlet 16 is an annulus provided at the front wall portion 24 having an L-shape with an elbow 17. The inlet 16 meets the chamber 22 along the center axis. Thus, fluid enters the inlet 16 at an axis perpendicular to the center axis and then turns at the elbow 17 so that it flows parallel with and along the center axis. Air reject port 18 lies inside inlet 16 and exits through an outer wall of the inlet at a portion of the inlet that has an axis perpendicular to the center axis. The inlet 16 has a large diameter that ranges between 25% and 50% of the diameter of the chamber, and most preferably is 33% of the diameter of the chamber. The large diameter of the inlet minimizes the tank head required to force the fluid into the chamber, prevents the inlet pressure from becoming a vacuum, and creates some pressure to force rejects out of the chamber. The large diameter also minimizes turbulence during the transition from linear to rotating flow, which in turn minimizes heat buildup.

The separation chamber 22 houses a rotating vane 32, or a plurality of such vanes, mounted on a shaft 36, which enters the chamber 22 through the rear wall 28. The shaft 36 is rotated via a motor (not shown). The vane 32 is spaced apart from the walls of the chamber to define a small gap 44. The rotation of the vane 32 defines a sweeping volume which occupies a substantial portion of the chamber volume in the range of 40% to 97% of the chamber volume. The sweeping volume is therefore defined as the chamber volume swept as the vane 32 rotates along its axis.

The small gap 44 leads to an exit chamber 68 which is located between the rear wall portion 28 and the rear of the vane 32. The rear wall portion 28 has an outlet 46. The area of the gap 44 is significantly larger than the area of outlet 46 for minimizing back pressure. This area is preferably 30% larger than the outlet area but can be up to 60% larger than the outlet area. Fluid moves faster through the outlet 46 than through the gap 44. The gap 44 has been found to contribute to the reduction of heat buildup.

Figure 3:
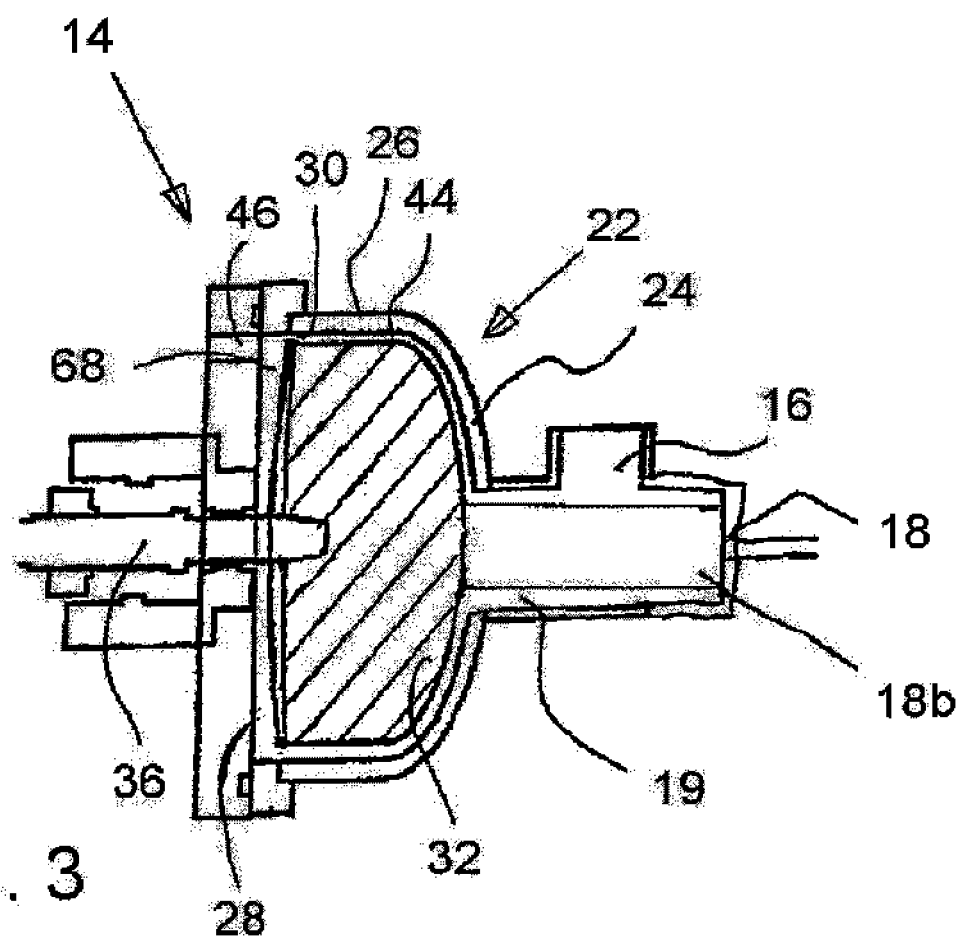
FIG. 3 is a side cross-section view of the deaerator of the present invention having a pre-shearing chamber.

An alternative embodiment shown in FIG. 3 further includes a pre-shearing chamber. The pre-shearing chamber includes a large air reject pipe 18b of the air reject port 18 mounted to the front of the rotating vane 32, surrounded by a pre-shear annulus 19 through which the fluid enters into the chamber. The pre-shear annulus 19 destroys any structure in the incoming fluid that a bubble would have to overcome during its removal. It also accelerates the entering fluid to the speed of rotation of the vanes. This is important since fluids have polymers that form structures with other polymers and pre-shearing those structures lowers the viscosity that a bubble works against during its removal. This in turn lowers the process intensity of the deaerator. In other words, pre-shearing allows air removal with less work and less heat buildup from the deaerator.

Figure 4:
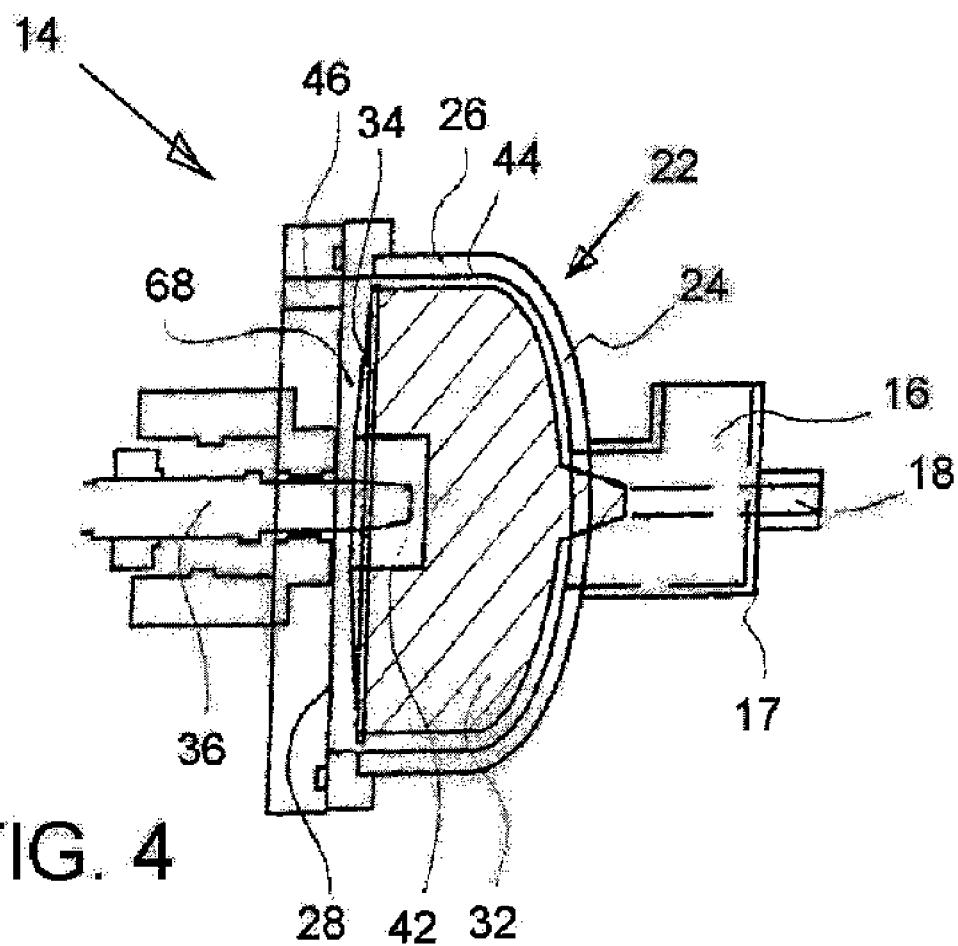
FIG. 4 is a side cross-section view of a deaerator in which a vane is mounted to a disc.
Figure 5:
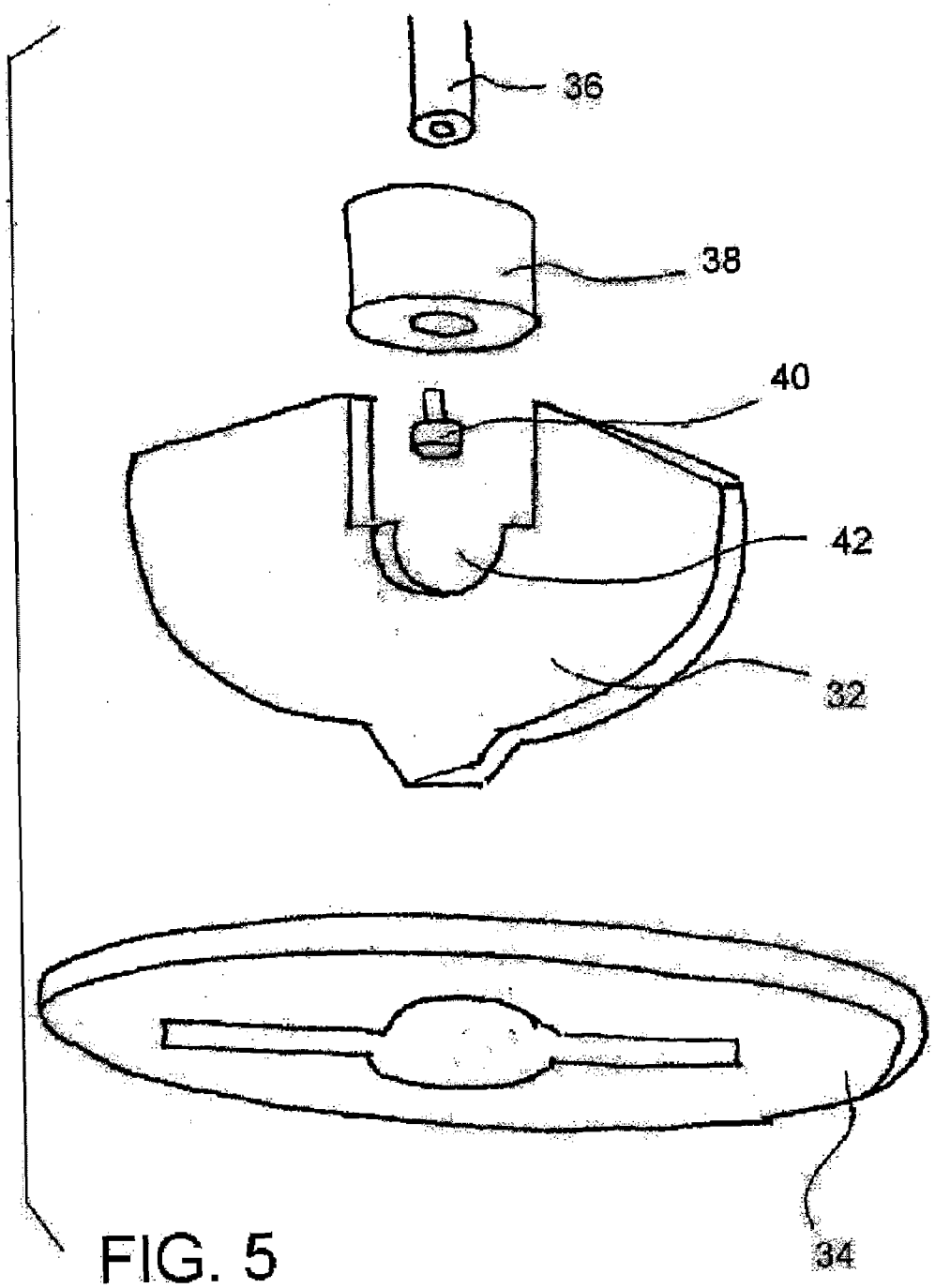
FIG. 5 is an exploded view of the mounting assembly for the vane shown in FIG. 3A.

In other alternative embodiments, various structures can be used to prevent toroidal flow in the exit chamber 68. In the alternative embodiment shown in FIG. 4, the separation chamber 22 houses a rotating vane 32 mounted to a shaft 36 via disc 34. The shaft 36 is rotated via a motor (not shown), which in turn rotates the disc and the attached vanes 32. The rotating vanes 32 are mounted on the shaft 36 and disc 34 via a hub 38 and a nut 40 as shown in FIG. 5. The vanes 32 have a notch 42 for permitting access to the nut 40 for removing the nut from the hub 38 for easy disassembly of the vane 32, disc 34, and hub 38. The disc 34 also prevents toroidal flow in the exit chamber 68.

The disc 34 is spaced apart from the peripheral wall of the chamber via an annulus 30 which may have the same or different diameter as the gap 44.

Figure 6:
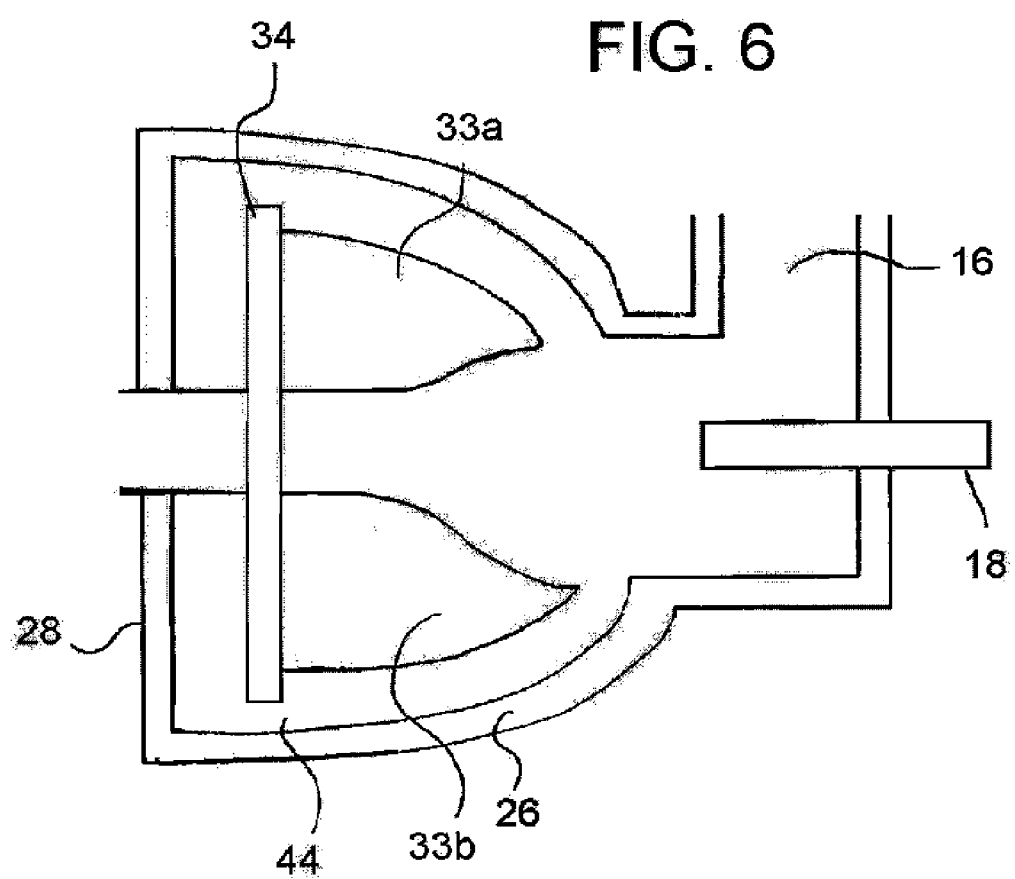
FIG. 6 is a side cross-section view of a deaerator in which two vanes are mounted to a disc.

As shown in FIG. 6, more than one vane may be mounted to the disc 34. FIG. 6 shows vanes 33a and 33b mounted to a disc 34. The diameter of the annulus 30 is also smaller than the diameter of the gap 44.

Figure 7:
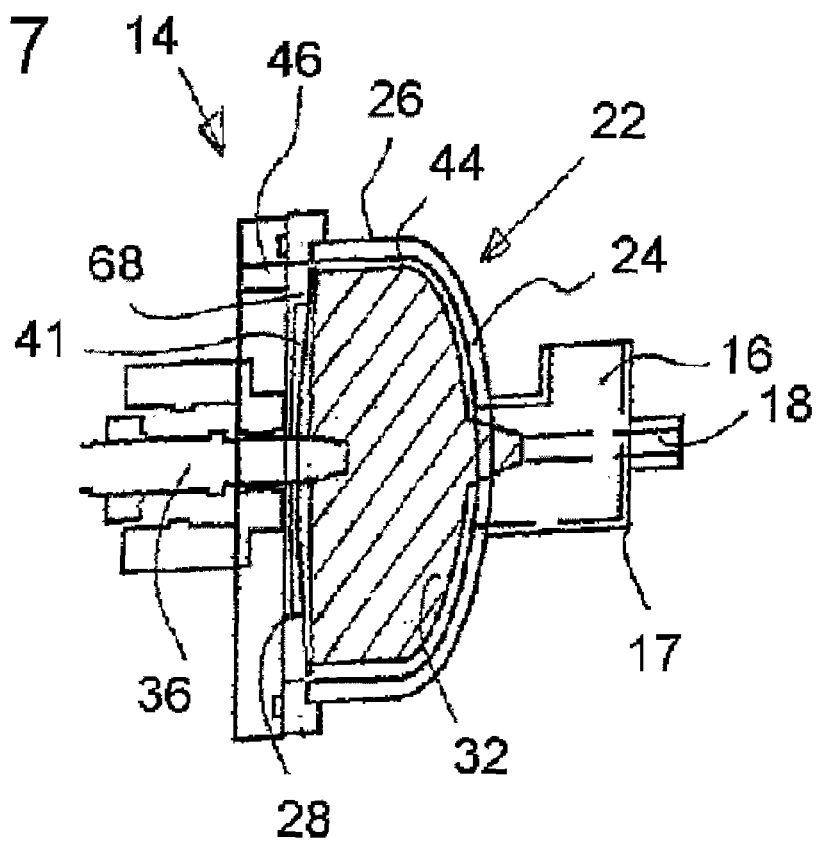
FIG. 7 is a side cross-section view schematically showing secondary angled vanes for preventing toroidal flow in the exit chamber.
Figure 8:
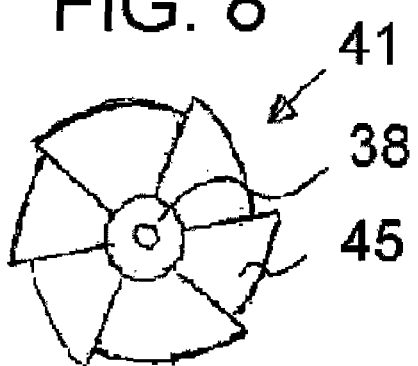
FIG. 8 is a front view of the angled vanes of FIG. 4A.

In another alternative embodiment, secondary angled vanes can be used to create a balancing pumping pressure to prevent toroidal flow in the exit chamber 68. FIG. 7 schematically shows an angled vane assembly 41 comprising angled vanes 45 mounted on the rear of the vane 32 via a hub 38 and a nut 40 (not shown) which holds the hub to the shaft. The angled vanes face the rear chamber wall 28. FIG. 8 shows a front view of the angled vanes which face the rear chamber wall 28.

Figure 9:
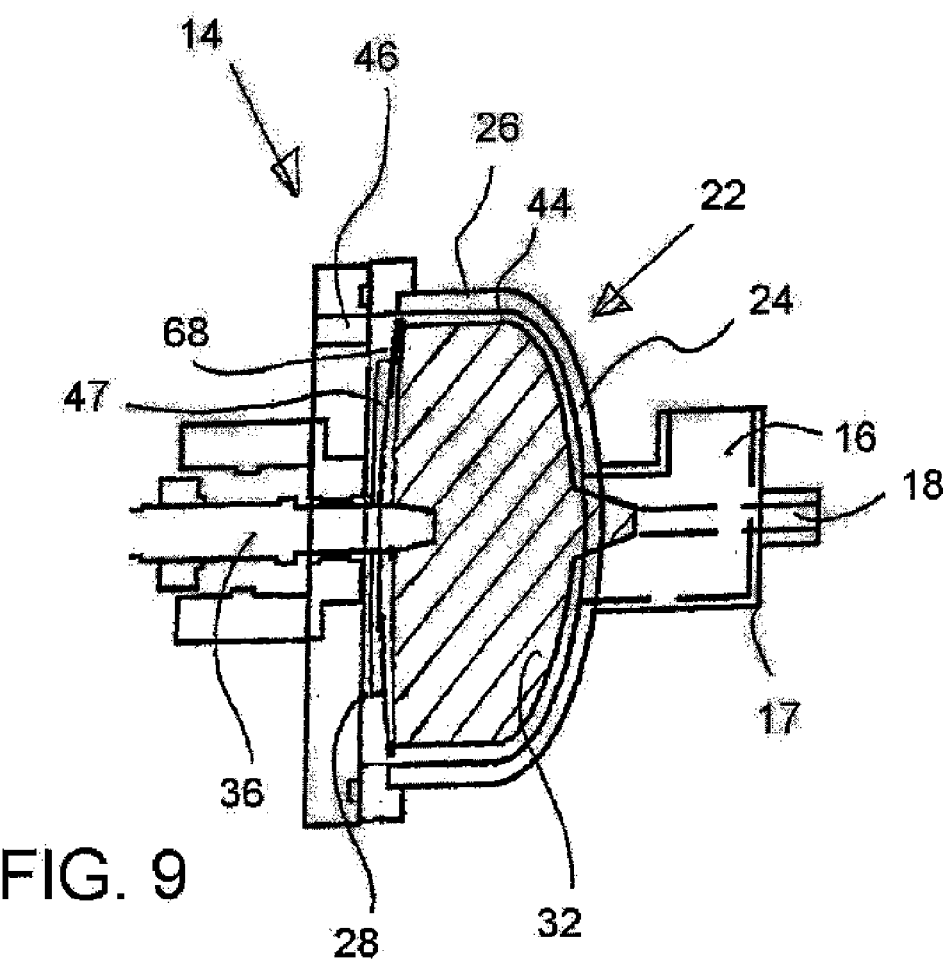
FIG. 9 is a side cross-section view schematically showing a ring for preventing toroidal flow in the exit chamber.

FIG. 9 shows an alternative embodiment in which a cylindrical member or ring 47 is mounted to the rear of the vane 32 to prevent toroidal flow in the exit chamber 68.

The operation of the deaerator is as follows. Fluid from a storage tank is introduced into the separation chamber 22 through the inlet 16. The vane 32 rotates at a relatively high RPM (e.g., between 2500 and 7200 RPM) and causes the fluid to swirl in the chamber. If a disc is used, the fluid is accelerated close to the angular velocity of the disc. Notably, the incoming fluid in the inlet 16 starts to spin as a result of the spinning of the fluid in the chamber. The spinning of the incoming fluid in the inlet 16 allows the fluid to gain the rotating motion gradually in the inlet annulus before the vanes impart full speed, thus reducing the turbulence associated with converting an axial flow to a rotating flow. Thus an important discovery of the present invention is that the reduced turbulence reduces heat buildup, which is a typical problem associated with rotating vane deaerators and centrifugal pumps. Reducing shear between the vanes and chamber wall can also reduce energy up to 90%, depending on the size of the gap 44.

When the incoming fluid passes through the inlet valve 50, it is at reduced pressure. The bubbles immediately expand doubling or quadrupling their buoyancy. At a reduced pressure, dissolved air boils out of solution also increasing the size of these bubbles. Further, some water boils to restore the vapor pressure and contributes to the size of the bubbles. Larger bubbles are easier to remove from viscous fluids. As the fluid approaches the outer wall of the chamber during centrifugation, the pressure increases and any remaining bubbles collapse and the air goes back into solution. The fluid leaving the deaerator 14 through the outlet 46 is an air starved solution and will dissolve air from the environment. This is particularly helpful for coating apparatuses, which must purge that air out of the lines, filters and any pockets where air may collect. High air content foam collects along the center axis of the chamber 22 due to centrifugal force. The rotation helps drain the liquid out of the foam, collapse small bubbles into larger ones, and make a high air content foam. The high air content foam is then withdrawn from the chamber 22 through the air reject port 18 by the vacuum source 75. The percentage of air content exiting through the air reject port 18 is approximately 90–99% and further drains in the degasser 70 before the gas phase is drawn into the vacuum source 75.

Low air fluid migrates to the peripheral wall of the chamber 22. The peripheral wall of the chamber may experience a pressure of 60 PSI while the central core foam may be at a pressure of 10 inches of water column or −12 PSIG. This pressure gradient keeps the air from migrating outwards and ensures its collection along the center axis of the chamber 22. Low air fluid content passes from the separation chamber 22 to the outlet 46 via the gap 44 or via the annulus 30 when a disc 34 is used.

Four features of the present invention contribute to reduced heat buildup. These four factors include the gap 44 between the chamber walls and vane, a means to prevent toroidal flow in the exit chamber 68 by a radial disc, angled vanes or vanes mounted to a disc, the structure and large area of the inlet that reduces the turbulence of the incoming fluid and gradually accelerates the rotation of the incoming fluid, and a pre-shear annulus in the inlet which reduces the viscosity of the fluid thereby reducing the process intensity required to remove bubbles. Tables 1–6 below show the heat buildup associated with various combinations of these features.

TABLE 1

Heat buildup for deaerator with vanes, and inlet is a 0.5" pipe offset from the center of rotation, and a 0.25" gap, based on viscosity of fluid

| Viscosity | RPM | Q (GPM) | dP (PSI) | Pump (HP) | Heat Buildup (BTU/gal) |
|---|---|---|---|---|---|
| medium viscosity fluid | 1034 | 0.22 | 10.5 | 0.001 | 25.5 |
| medium viscosity fluid | 1550 | 1.61 | 25 | 0.023 | 46.7 |
| medium viscosity fluid | 2067 | 2.79 | 41.5 | 0.068 | 48.9 |
| medium viscosity fluid | 2584 | — | 52 | — | 40.4 |
| high viscosity fluid | 1034 | 0.38 | 11.3 | 0.003 | 63.5 |
| high viscosity fluid | 1550 | 0.81 | 25.5 | 0.012 | 64.9 |
| high viscosity fluid | 2067 | 1.70 | 41.5 | 0.041 | 47.3 |
| high viscosity fluid | 2584 | — | — | — | 58.6 |
| water | 1550 | 2.12 | 28 | 0.035 | 33.4 |

TABLE 2

Heat buildup for deaerator with two vanes, a 0.5" inlet pipe offset from the center of rotation, and a 0.5" gap, based on viscosity of water

|   | RPM | Q (GPM) | dP (PSI) | Pump (HP) | Heat Buildup (BTU/gal) |
|---|---|---|---|---|---|
| 1 | 1550 | 1.89 | 24.5 | 0.027 | 16.9 |
| 2 | 1550 | 1.86 | 25 | 0.027 | 26.9 |
| 3 | 1550 | 1.86 | 25 | 0.027 | 31.0 |
| 4 | 1550 | 1.82 | 24 | 0.025 | 23.6 |

TABLE 3

Heat Buildup for deaerator with four vanes, 0.5" inlet pipe offset from the center of rotation, and a 0.25" gap, based on viscosity of water

|   | RPM  | Q (GPM) | dP (PSI) | Pump (HP) | Heat Buildup (BTU/gal) |
|---|------|---------|----------|-----------|------------------------|
| 1 | 1550 | 1.93    | 28.5     | 0.032     | 29.3                   |
| 2 | 1550 | 1.89    | 28.5     | 0.031     | 28.5                   |

TABLE 4

Heat Buildup for deaerator with 2 vanes, 0.5" gap, 0.5" outlet and 2" annular inlet, based on viscosity of water

|   | RPM  | Q (GPM) | dP (PSI) | Pump (HP) | Heat Buildup (BTU/gal) |
|---|------|---------|----------|-----------|------------------------|
| 1 | 1550 | 9.1     | 3        | 0.01596   | 30.2                   |
| 2 | 1550 | 2.0     | 8        | 0.0092    | 18.0                   |
| 3 | 3100 | 8.3     | 24       | 0.1156    | 41.0                   |
| 4 | 2584 | 6.9     | 17.5     | 0.0706    | 40.1                   |

TABLE 5

Heat Buildup for deaerator with 2 or 4 vanes connected to a disc, and various sized gaps and outlets, based on viscosity of water

|                                      | RPM  | Q (GPM) | dP (PSI) | Pump (HP) | Heat Buildup (BTU/gal) |
|--------------------------------------|------|---------|----------|-----------|------------------------|
| 2 vanes 0.5" gap                     | 1550 | 10.9    | 4        | 0.02548   | 36.2                   |
| 2 vanes 0.5" gap                     | 3100 | 12.5    | 20       | 0.14593   | 51.8                   |
| 2 vanes 0.5" gap 0.25" outlet        | 1550 | 0.7     | 6        | 0.00246   | 6.4                    |
| 2 vanes 0.5" gap 0.25" outlet        | 2894 | 1.5     | 24       | 0.02057   | 30.4                   |
| 4 vanes 0.25" gap 0.25" outlet       | 2738 | 1.3     | 24       | 0.01851   | 31.7                   |

TABLE 6

Heat Buildup for deaerator with 2 vanes connected to a disc and a 0.5" gap with varying dilutions of fluid

|                          | RPM  | Q (GPM) | dP (PSI) | Pump (HP) | Heat Buildup (BTU/gal) |
|--------------------------|------|---------|----------|-----------|------------------------|
| No dilution              | 2066 | 0.9     | 14.5     | 0.00787   | 29.3                   |
|                          | 3100 | 1.4     | 30       | 0.02461   | 72.2                   |
| 1$^{st}$ dilution        | 3100 | 2.1     | 28       | 0.03502   | 44.4                   |
| 2$^{nd}$ dilution        | 3100 | 0.9     | 29       | 0.01558   | 29.0                   |
|                          | 3100 | 3.8     | —        | —         | —                      |
| 3$^{rd}$ dilution        | 3100 | 1.1     | 27.5     | 0.01811   | 67.3                   |
|                          | 3100 | 2.7     | 26       | —         | 44.0                   |

The deaerator of the present invention can be affected by various characteristics of incoming fluid. First, the present invention applies to many different types of fluids having a wide ranging variety of viscosities. For example, the present invention can be used with inks, oils (e.g., motor oil), shampoos, conditioners and other similar consumer products, coating fluids, food products (e.g., tomato paste), paint, and varnish.

Second, the deaerator of the present invention achieves a significant reduction in heat buildup despite so-called entrance effects of non-Newtonian fluids described in applicant's co-pending application Ser. No. 10/662,666. Fluids have a Shear Energy Absorption (SEA) which is the requirement to absorb energy as the fluid transitions to a higher shear rate. The SEA of a fluid is related to the uncoupling or breakdown of the chemical structures such as hydrogen bonding, Van der Waals forces, and ionic association. Once this energy is satisfied, a fluid will exhibit a lower viscosity. As virtually all commercial fluids are non-Newtonian, the SEA or entrance effect can vary widely.

Figure 10:
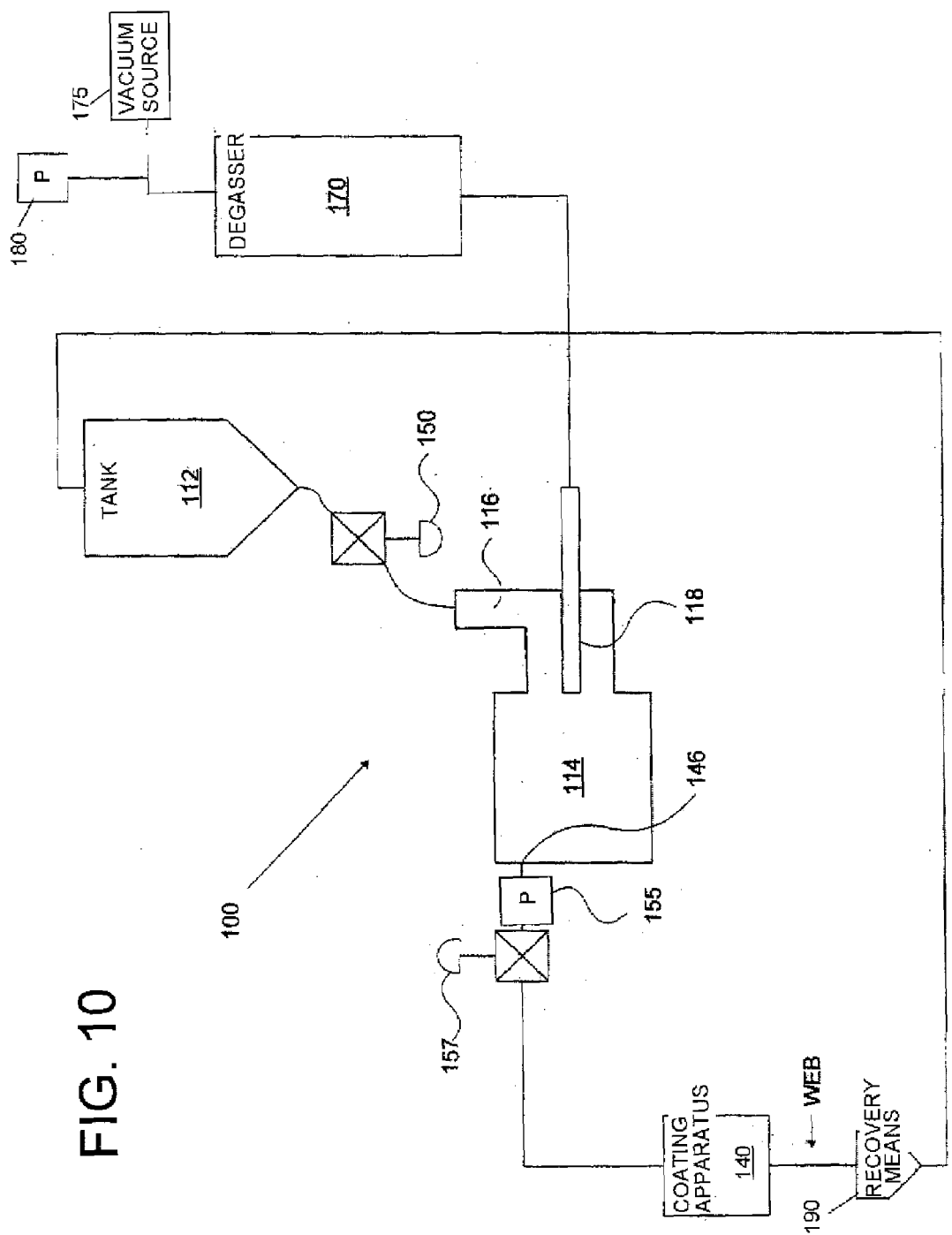
FIG. 10 is a schematic diagram of the deaeration system of the present invention in which deaerated fluid is used in a coating application and extra fluid is redirected back to a tank.

Finally, the deaeration system and deaerator of the present invention are particularly useful in coating applications. FIG. 10 shows a deaeration system 100 for deaerating a coating in coating applications. System 100 comprises a tank 112 containing the coating to be deaerated, a deaerator 114 connected to the tank 112, and an inlet valve 150 located between the tank 112 and the deaerator 114 for controlling the volume of coating flowing to the deaerator 114. The deaerator 114 has an inlet 116 and an air reject port 118 at one end and an outlet 146 at an opposite end. A pressure sensor 155 and valve 157 are located near an outlet 146 of the deaerator 114. Next, the coating apparatus 140 applies the flowing coating to a web, and a recovery means 190 directs a portion of the coating back to the tank 112. The air reject port 118 is connected to a degasser 170 and a vacuum source 175. A vacuum sensor 180 is connected to the vacuum source 175.

While a specific embodiment of the invention has been shown and described in detail to illustrate the application of the principles of the invention, it will be understood that the invention may be embodied otherwise without departing from such principles.

What is claimed is:

1. A deaerator for centrifugally separating air from a fluid, comprising:
   a stationary separation chamber defining a volume and having a center axis, a front wall on one side, a peripheral wall, and a rear wall opposite said front wall;
   an inlet arranged at the front wall of the stationary chamber along said center axis;
   an air reject port arranged at the front wall along the center axis;
   a rotating vane mounted to a shaft driven by a motor and occupying a sweeping volume of said chamber, wherein a gap is defined between the sweeping volume and the peripheral wall of said chamber; and
   an outlet in the rear wall in communication with said gap having an outlet area for receiving fluid.

2. A deaerator according to claim 1, wherein said rotating vane is connected to a disc mounted on said shaft, the disc being spaced from the peripheral wall so that an area between said disc and said peripheral wall is substantially larger than said outlet area.

3. A deaerator according to claim 2, wherein said rotating vane is mounted on the shaft and disc via a hub and nut which holds the hub to the shaft.

4. A deaerator according to claim 3, wherein said vane has a central notch for providing access to said nut for removal of said nut from said hub for disassembly of said shaft, hub, disc, and vane.

5. A deaerator according to claim 2, wherein a plurality of vanes are mounted on said shaft and disc.

6. A deaerator according to claim 1, wherein a plurality of vanes are mounted on said shaft.

7. A deaerator according to claim 1, wherein the air reject port is comprises an air reject pipe contained within the inlet defining a pre-shear annulus outside of the air reject pipe.

8. A deaerator according to claim 1 further comprising an exit chamber arranged between said rear wall and said rotating vane.

9. A deaerator according to claim 1, wherein said inlet has a diameter that ranges between 25% and 50% of the diameter of the chamber, and most preferably is 33% of the diameter of the chamber.

10. A deaerator according to claim 1, wherein said sweeping volume occupies 40% to 97% of the chamber volume.

11. A deaerator according to claim 1, wherein said gap area is up to 60% larger than said outlet area, but is preferably 30% larger than said outlet area.

12. A deaerator system for centrifugally separating air from a fluid, comprising:
- a stationary separation chamber defining a volume and having a center axis, a front wall on one side, a peripheral wall, and a rear wall opposite said front wall;
- an inlet arranged at the front wall of the stationary chamber along said center axis;
- an air reject port arranged at the front wall along the center axis;
- a rotating vane mounted to a shaft driven by a motor and occupying a sweeping volume of said chamber, wherein a gap is defined between the sweeping volume and the peripheral wall of said chamber;
- an outlet in the rear wall in communication with said gap having an outlet area for receiving fluid, wherein said gap has an area that is substantially larger than said outlet area;
- a vacuum source connected to the air reject port;
- a variable orifice valve at the inlet and outlet;
- a vacuum sensor at the vacuum source;
- a pressure sensor at said inlet or said outlet; and
- and control means for controlling said valves to control the fluid flow, internal level, and pressure in said chamber.

13. A deaeration system according to claim 12, further comprising a degasser between said vacuum source and said air reject port.

14. A deaerator system according to claim 12, further comprising a storage tank for supplying gas-containing fluid to said inlet and a collector for receiving deaerated fluid from said outlet.

15. A deaerator system according to claim 12, further comprising a coating apparatus connected to said outlet for receiving deaerated fluid.

16. A deaerator according to claim 12, wherein said rotating vane is connected to a disc mounted on said shaft, the disc being spaced from the peripheral wall to form an annulus.

17. A deaerator according to claim 16, wherein said rotating vane is mounted on the shaft and disc via a hub and nut which holds the hub to the shaft.

18. A deaerator according to claim 15, wherein said vane has a central notch for providing access to said nut for removal of said nut from said hub for disassembly of said shaft, hub, disc, and vane.

19. A deaerator according to claim 16, wherein a plurality of vanes are mounted on said shaft and disc.

20. A deaerator according to claim 12, wherein a plurality of vanes are mounted on said shaft.

21. A deaerator according to claim 12, wherein the air reject port is comprises an air reject pipe contained within the inlet defining a pre-shear annulus outside of the air reject pipe.

22. A deaerator according to claim 12, further comprising an exit chamber arranged between said rear wall and said rotating vane.

23. A deaerator according to claim 12, wherein said inlet has a diameter that ranges between 25% and 50% of the diameter of the chamber, and most preferably is 33% of the diameter of the chamber.

24. A deaerator according to claim 12, wherein said sweeping volume occupies 40% to 97% of the chamber volume.

25. A deaerator according to claim 12, wherein said gap area is up to 60% larger than said outlet area, but is preferably 30% larger than said outlet area.

* * * * *